UNITED STATES PATENT OFFICE.

GUSTAF W. MAGNUS, OF SEATTLE, WASHINGTON.

WATERPROOFING COMPOSITION.

1,416,852.	Specification of Letters Patent.	Patented May 23, 1922.

No Drawing.	Application filed January 26, 1922.  Serial No. 531,931.

*To all whom it may concern:*

Be it known that I, GUSTAF W. MAGNUS, a citizen of the United States, residing at Seattle, in the county of King and State of Washington, have invented certain new and useful Improvements in Waterproofing Compositions, of which the following is a specification.

This invention relates to an improved waterproofing composition of matter, and particularly to improvements to my prior United States Letters-Patent No. 1,079,782, issued November 25, 1913, for improvements in liquid waterproof surfacing compositions.

The principal object of the present invention is the provision of a waterproofing composition that will be particularly useful as a base for paints and in the general application of the material to the waterproofing of fabric, cement and steel or wherever an impervious and durable protective coating is desired.

With the above and other objects in view, which will appear as the description proceeds, the invention resides in the novel composition of materials and the method of compounding the same, as will be hereinafter described and claimed, it being understood that within the scope of what is claimed, changes in the precise quantities and procedure described can be made without departing from the spirit of the invention.

My improved composition consists in combining forty parts by weight of raw linseed oil with one part by weight of rubber, preferably waste vulcanized rubber, although the crude rubber may be used. Boiling said materials about four hours while stirring sufficiently to keep from scorching. The material is then cooled off and strained. A drier consisting of one and one-third parts by weight of sugar of lead, ground in oil, and thinned with an equal amount by weight of gasolene, is added. For faster drying, four parts of Japan drier may be added to the material instead.

The material will then be ready for use but may be thinned or modified for the various paint or waterproofing uses by the addition of gasoline, benzine, or equivalent agents.

The source of rubber supply giving the best satisfaction at the present time with regard to quality and price is in junk inner tubes of automobile tires. The entire quantity of rubber included in the formula stated above will not be utilized or absorbed by the oil in each instance as the capacity for absorbing rubber varies with different lots of oil but the unused rubber substance strained out of the material may be used over again in the next lot.

Having described my invention, what I claim, is:—

1. A waterproofing composition consisting of forty parts by weight of raw linseed oil, one part by weight of rubber, and a drier.

2. A waterproofing composition consisting of forty parts by weight of raw linseed oil, one part by weight of rubber, one and one-third parts sugar of lead, and one and one-third parts gasoline.

3. A waterproofing composition consisting of forty parts by weight of raw linseed oil, one part by weight of rubber, one and one-third parts of sugar of lead, and sufficient gasoline to suitably thin the material for the purpose intended.

4. A method of compounding a waterproofing composition, consisting in boiling raw linseed oil and rubber for approximately four hours, cooling and straining the mixture, adding a drier, and then thinning the mixture to the desired consistency with gasoline.

Signed at Seattle, Washington, this 21 day of January, 1922.

GUSTAF W. MAGNUS.